United States Patent [19]
Bourgeois

[11] Patent Number: 6,058,830
[45] Date of Patent: May 9, 2000

[54] GAS FIRED OUTDOOR COOKING APPARATUS

[75] Inventor: Norman R. Bourgeois, Jefferson, La.

[73] Assignee: Metal Fusion, Inc., Jefferson, La.

[21] Appl. No.: 09/426,210

[22] Filed: Oct. 25, 1999

Related U.S. Application Data

[63] Continuation-in-part of application No. 09/149,842, Sep. 8, 1998, Pat. No. 5,970,852, which is a continuation of application No. 08/813,463, Mar. 10, 1997, Pat. No. 5,813,321.

[51] Int. Cl.$^7$ .............................. A47J 37/00; A47J 37/04; A47J 43/18
[52] U.S. Cl. ................................ 99/340; 99/413; 99/419; 99/426; 99/450; 99/482; 126/30; 126/40
[58] Field of Search ............................... 99/339, 340, 345, 99/426, 403–418, 481, 482, 419–421 V, 444–450; 126/41 R, 25 R, 40, 30, 9 R; 426/523

[56] References Cited

U.S. PATENT DOCUMENTS

| | | | |
|---|---|---|---|
| 3,583,307 | 6/1971 | Lee, Sr. | 99/446 X |
| 4,420,493 | 12/1983 | Greck | 99/419 X |
| 4,450,759 | 5/1984 | Steibel | 99/426 X |
| 4,945,824 | 8/1990 | Borgmann | 99/403 |
| 5,431,092 | 7/1995 | Guillory | 99/410 |
| 5,575,198 | 11/1996 | Lowery | 99/426 |
| 5,586,489 | 12/1996 | Fraga | 99/421 H |
| 5,662,028 | 9/1997 | Fraga | 99/448 |
| 5,665,258 | 9/1997 | Hsu | 99/421 P |
| 5,673,611 | 10/1997 | Tieman | 99/449 X |
| 5,813,321 | 9/1998 | Bourgeois | 99/340 |
| 5,970,852 | 10/1999 | Bourgeois | 99/340 |

*Primary Examiner*—Timothy Simone
*Attorney, Agent, or Firm*—Garvey, Smith, Nehrbass & Doody, LLC

[57] ABSTRACT

A cooking apparatus enables a user to cook (boiling, steaming or frying). The apparatus includes a burner having a base that is specially shaped to cradle a pot. An upper ring extends above the support surface of the burner for engaging the sidewall of the pot should the pot be tipped inadvertently. A table removably attaches to the burner frame, preferably at the upper ring. The burner can include an upper ring member that is supported above the bottom of the pot and a lower ring member that engages an underlying supporting ground surface. Alternatively, the burner frame has a plurality of circumferentially spaced radially extending legs. Struts are shaped and cradle the bottom of the pot and its sidewall respectively.

18 Claims, 11 Drawing Sheets

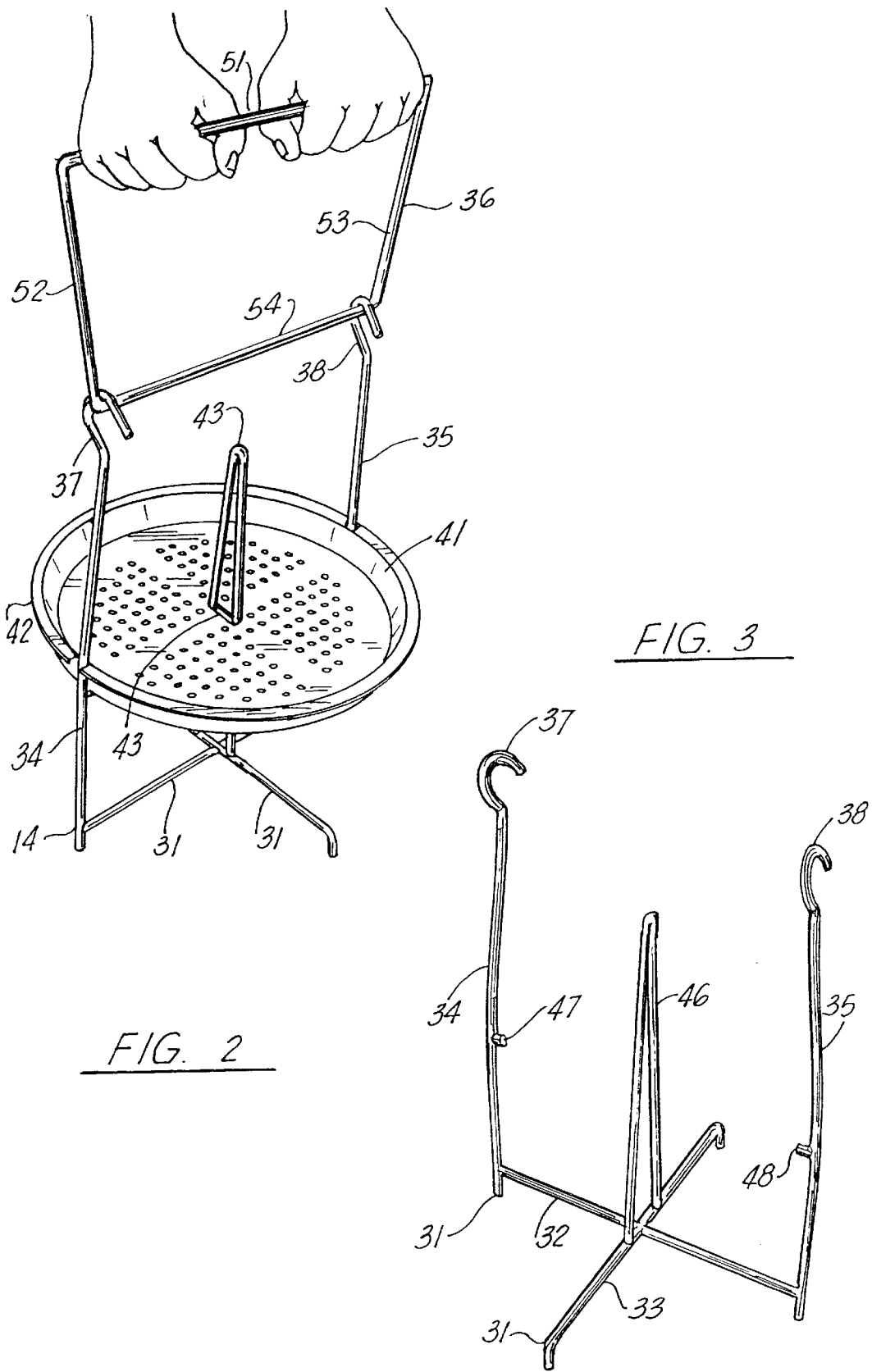

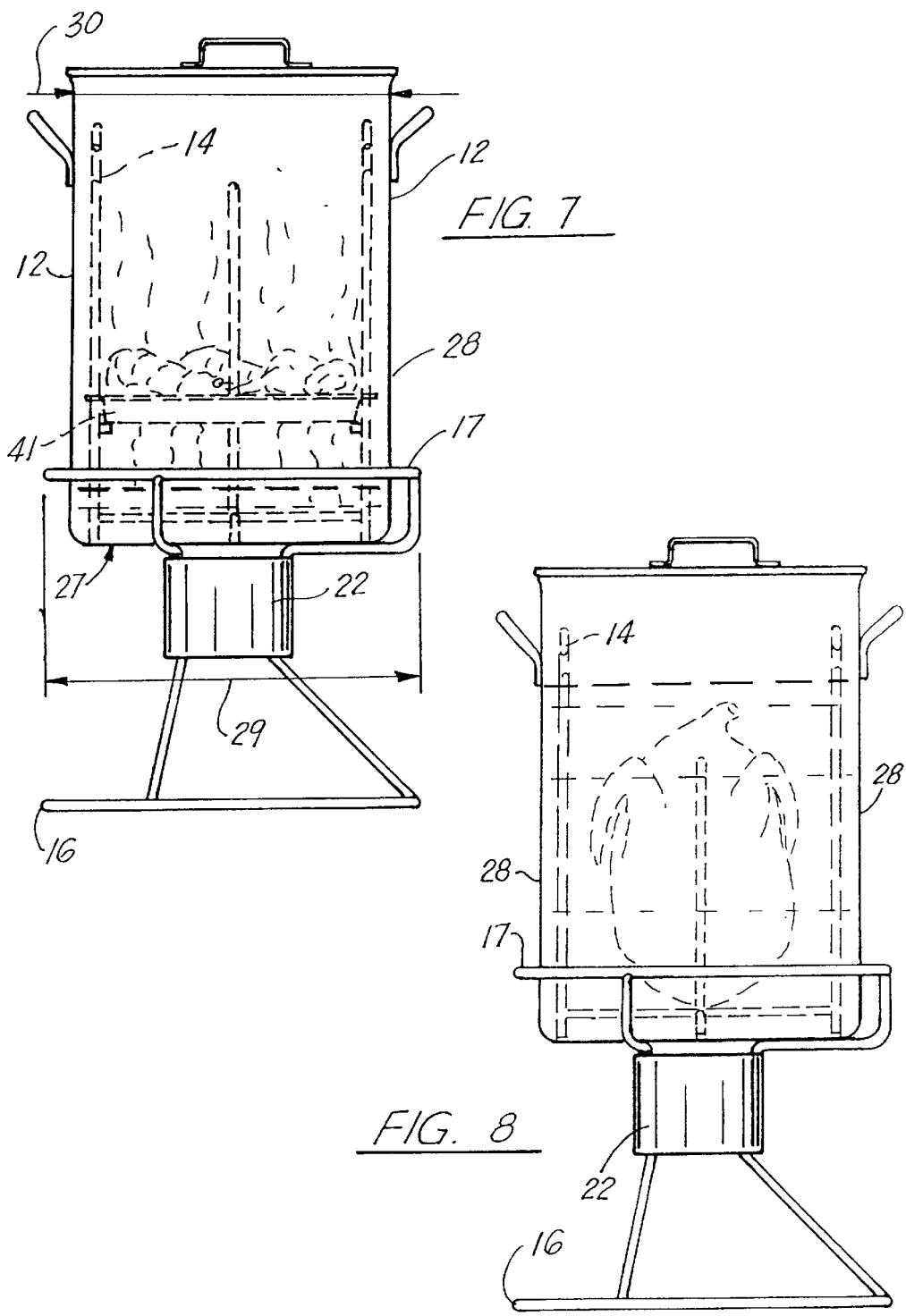

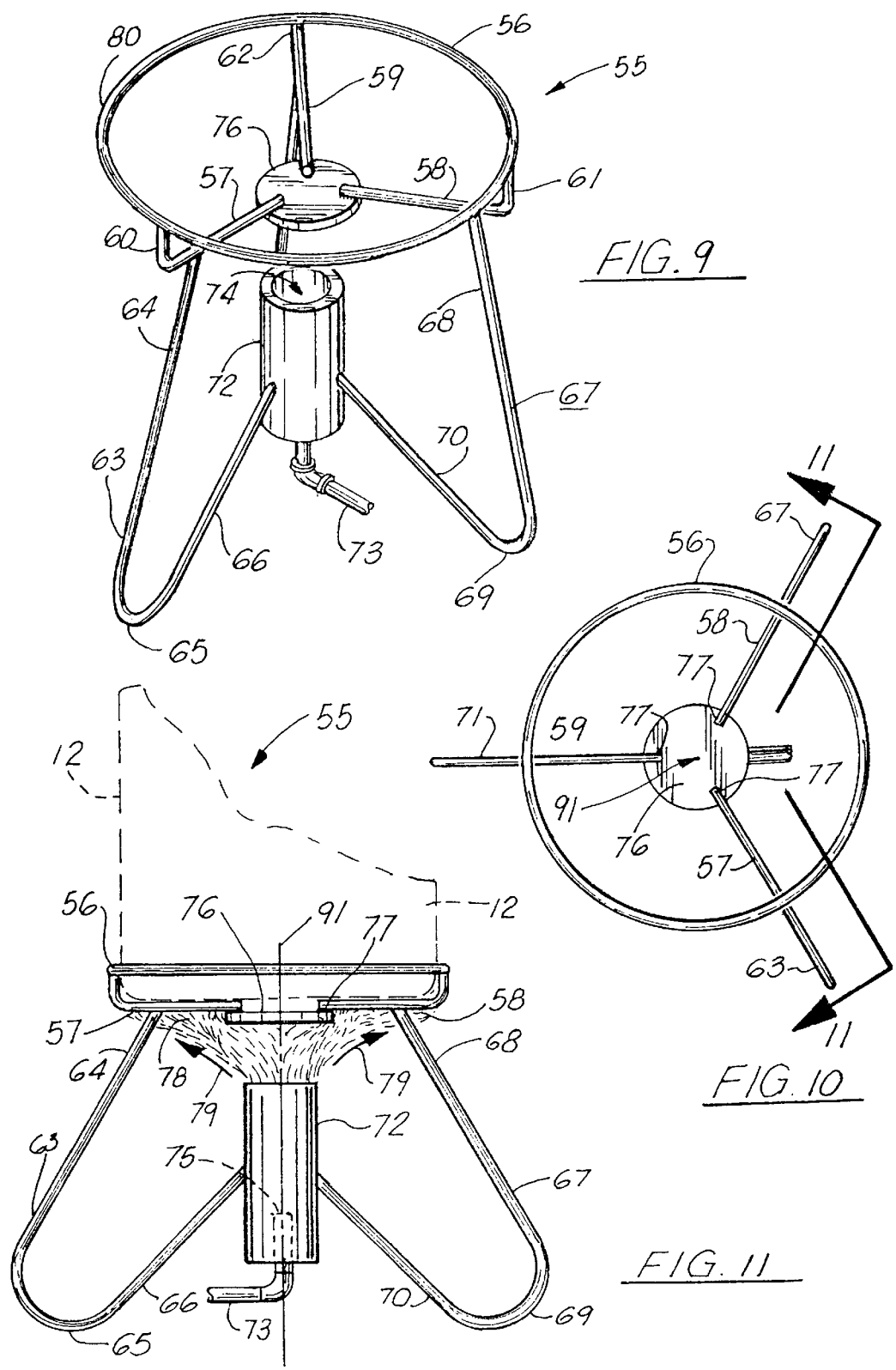

GAS FIRED OUTDOOR COOKING APPARATUS

CROSS-REFERENCE TO RELATED APPLICATIONS

This is a continuation in part of U.S. patent application Ser. No. 09/149,842, filed Sep. 8, 1998, U.S. Pat. No. 5,970,852, which is a continuation of application Ser. No. 08/813,463, filed Mar. 10, 1997 now U.S. Pat. No. 5,813,321.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to outdoor cooking devices and cooking accessories and more particularly to a natural gas fired outdoor cooker that is supplied with a source of fuel such as butane or propane from a canister and that includes a stand, pot, and pot liner, the improvement including a special configuration of the burner and a connected table that enables a user to quickly support a pot liner or basket upon the table after it is removed from the pot of boiling liquid.

2. General Background of the Invention

A number of outdoor cookers have been sold commercially for a number of years and are admitted as "prior art" type burners. These "prior art" burners have traditionally included a metallic frame that supports a burner nozzle, such as a cast iron burner nozzle. Such burner nozzles are commercially available and are used to fire most natural gas fired hot water heaters.

Examples of these prior art type outdoor cooking devices can be seen in the Jan. 1, 1996 brochure of Metal Fusion, Inc., of Jefferson, La.

The burner nozzle can be a cast iron hot water heater type burner nozzle or a jet burner arrangement that uses a single outlet centered in a cylindrically-shaped, vertically oriented metallic tube. The most common version of the prior art "jet burner" arrangement is seen in Metal Fusion's catalog as Model No. 90PK. Another version of this type of cooker includes two spaced apart circular rings connected with struts and having a cylindrically-shaped wind guard or shroud. This type of prior art burner can be seen for example as Metal Fusion Model Nos. 82PK, 83PK, 85PK, 86PK, and 86PKJ.

For cooking some food items such as poultry items, it is sometimes desirable to fry the object in a basket that can be lifted from the pot. An example of this type of "prior art" arrangement is seen in the 1996 Metal Fusion catalog as Model No. 32TPK. For a combination cooking arrangement that includes a burner, pot and liner, the user typically places the poultry item in the basket and lowers it into boiling oil using a bail. In the prior art, bails have often been detachable from the basket so that the user can lower the basket into the pot and the contained boiling oil and then remove the handle or bail therefrom. This allows the user to eliminate the transfer of heat from the basket to the handle during the elongated cooking process.

A number of patents have issued that relate to cooking devices and utensils for use in combination with cooking vessels. The Walker U.S. Pat. No. 4,735,135 provides a utensil assembly and kit including same for cooking vessels used in preparing and supporting combustibles above the bottom of the cooking vessel and away from its inner walls. The utensil kit comprises a base supported above the bottom of the cooking vessel, a plurality of support attachments separately detachable and interchangeably mountable on the base for supporting selected combustible products, and releasable latch mechanism having two parts, one part disposed on the base, and the other part is disposed on each of the support attachments for engaging the base. One of the utensils is a poultry support attachment that fits inside the cavity of a chicken or other poultry enabling it to be positioned upright.

The Rappaport U.S. Pat. No. 3,053,169, discloses a poultry supporting device that sits upon a base in the form of a pan.

A rotisserie cooking arrangement is disclosed in the French Patent 2685862.

A roasting support for fowl is disclosed in U.S. Pat. No. 5,106,642. The apparatus includes a longitudinally extending rod that extends through the center of the turkey having an eyelet at its upper end.

A roaster for poultry and meat is disclosed in U.S. Pat. No. 5,301,602. The apparatus includes a vertical roasting apparatus wherein a predetermined amount of liquid for generating the moisture required to produce a high quality and flavorful roasting of the meat is included in a reservoir formed within the support structure itself and disposed internally of the poultry or meat being roasted.

A vertical spit for displaying roasting or warming is disclosed in U.S. Pat. No. 5,442,999.

A combination outdoor cooker and smoker is disclosed in U.S. Pat. No. 5,531,154. The apparatus includes a cooker having a gas burner coupled to an external gas source through a control valve by a gas supply conduit.

An Austrian patent 217592 discloses a cooking device that has a central member upon which a turkey or chicken is supported during the cooking operation.

British patent 2205734A discloses a device for use in preparing and cooking kebabs that includes walls which are interconnected to define a tube member and into which a first end wall is slidably received to further reinforce the shape formed by the sidewalls and whose end position is determined by the engagement of lips projecting inwardly from the sidewalls. The sidewalls are appertured longitudinally for receiving a knife to cut food within the tube member.

Recently issued patents to Barbour (U.S. Pat. Nos. 5,758,569 and 5,896,810) disclose a cooking apparatus directed to the frying of poultry items such as turkeys.

One of the problems with outdoor cookers is the handling of a batch of food once cooked. Items that are cooked in large pots (e.g. 100 quart) inside liners or strainers are very hot when removed. These food items can be very heavy, weighing as much as fifty pounds in some situations, often comprising a large number of crabs, shrimp, etc., or a large turkey as examples. The cooked food items typically drip heated cooking juices, such as seasoned water, or even hot oil. It is desirable that such an outdoor cooking apparatus have stability to support both the pot during cooking and the pot insert (e.g. basket) after cooking is complete.

BRIEF SUMMARY OF THE INVENTION

The present invention includes a burner frame having a base for engaging an underlying support surface, the burner having a nozzle for generating a high intensity flame for use in cooking, and a supply hose for supplying propane to the burner. The burner frame has a support surface for cradling a pot.

A pot is provided that includes a flat bottom portion and cylindrically-shaped continuous side walls, the pot having a generally cylindrically-shaped interior for receiving a basket. The basket or liner removably fits the pot interior. The basket can include a base that registers against the bottom of the pot and a vertically extending portion adjacent to the pot wall that connects to a bail.

The burner frame includes a ring that is supported above the bottom of the pot on the exterior of the pot for engaging the sidewall of the pot should the pot be tipped.

The upper ring is supported by a plurality of generally "L" shaped struts that extend from the upper ring downwardly along a generally vertical path and then horizontally to cradle the bottom of the pot.

A table removably connects to the burner at the frame. The table extends well above the burner, but below the top of the pot during use. This improved overall geometry is stable, easy to use, and safer than present outdoor cooking devices.

BRIEF DESCRIPTION OF THE SEVERAL VIEW OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is a partial perspective view of the preferred embodiment of the apparatus of the present invention illustrating the basket, steam plate, and bail;

FIG. 3 is a partial perspective of the preferred embodiment of the apparatus of the present invention illustrating the basket portion thereof;

FIG. 7 is a sectional elevation view of the preferred embodiment of the apparatus of the present invention illustrating the burner, pot, and basket portions thereof during steaming;

FIG. 8 is a sectional elevation view of the preferred embodiment of the apparatus of the present invention illustrating the burner, pot, and basket portions thereof during boiling;

FIG. 9 is a perspective view of the preferred embodiment of the apparatus of the present invention showing an alternate burner construction;

FIG. 10 is a top view of the burner of FIG. 9;

FIG. 11 is a sectional view taken along lines 11-11 of FIG. 10;

DETAILED DESCRIPTION OF THE INVENTION

Figure 1:
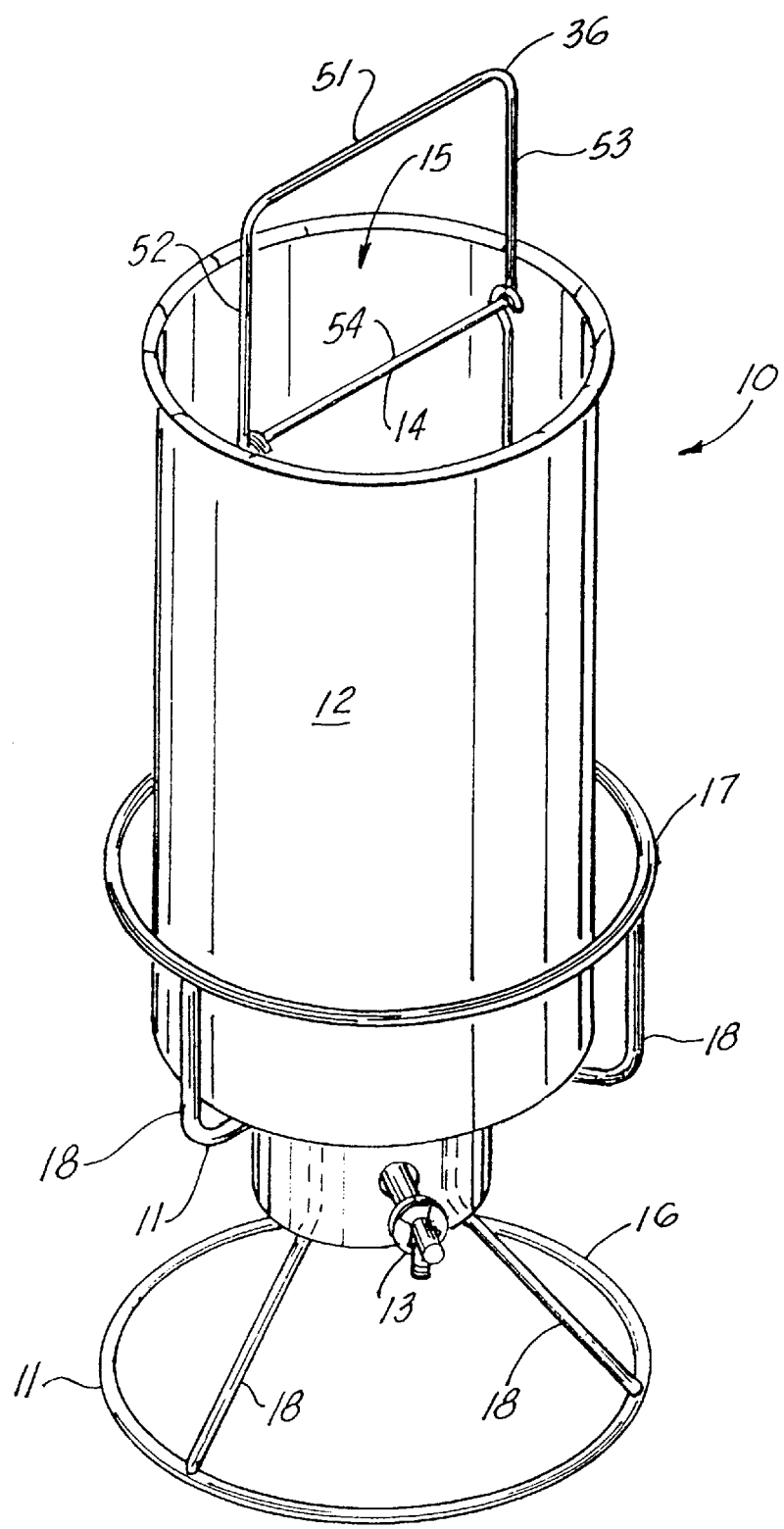
FIG. 1 is a perspective view of the preferred embodiment of the apparatus of the present invention.

The present invention provides an outdoor cooking apparatus designated generally by the numeral 10 in FIG. 1. The apparatus 10 includes a burner 11, pot 12, supply valve 13, and flexible hose 13 for supplying propane for firing the burner 11, and a basket 14 (see FIGS. 2–3) that can be lowered into the interior 15 of pot 12. In FIGS. 4–8, burner 11 includes a lower ring 16 and an upper ring 17. Burner 11 has a nozzle or jet surrounded by cylindrically-shaped wind guard 22.

The rings 16, 17 are connected with a plurality of struts. Each strut 18 includes radially extending, inclined lower strut section 19, upper strut section 20, and vertical center strut section 21. Each of the lower strut sections 19 is linear in shape, and inclined to form a connection between the lower or base ring 16 and the bottom of central strut section 20 (see FIG. 6).

Upper strut sections 20 are generally "ell" shaped having a lower end portion 23 that forms a connection with the upper end of central strut section 21 and an upper end 24 that forms a connection with upper ring 17.

The "ell" shaped upper strut sections 20 include upper linear section 24, lower linear section 23, and bend sections 25, 26. This configuration provides both a base for holding the bottom surface 27 of pot 12 and a vertically extending portion that envelopes the lower end of pot sidewall 28.

Figure 4:
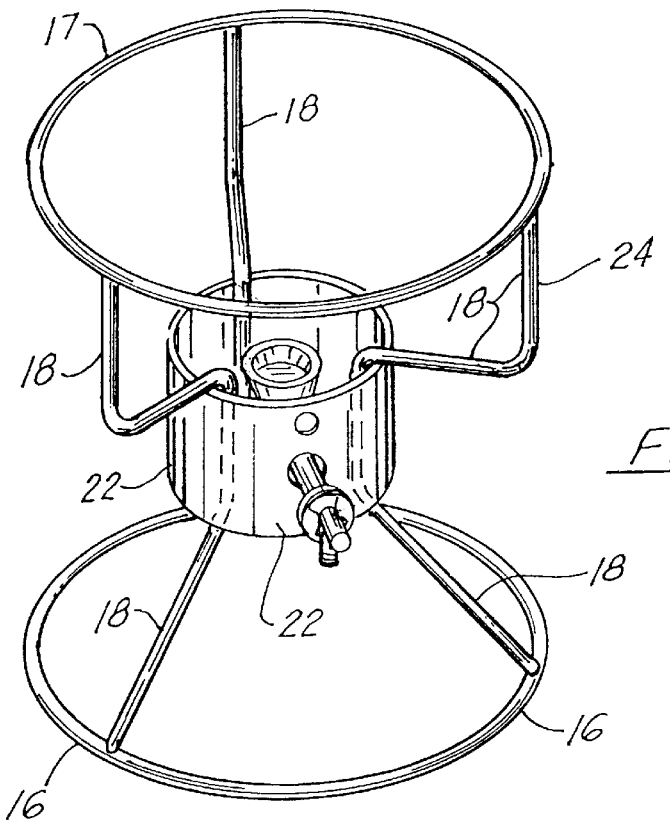
FIG. 4 is a fragmentary perspective view of the preferred embodiment of the apparatus of the present invention illustrating the burner portion thereof.
Figure 5:
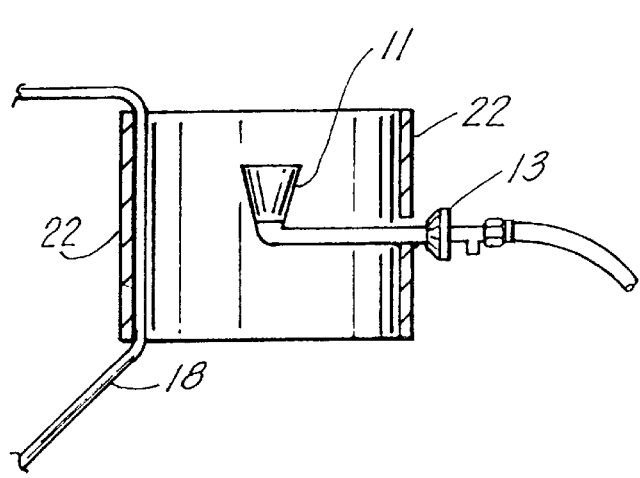
FIG. 5 is a fragmentary sectional elevation view of the burner of FIG. 4.
Figure 6:
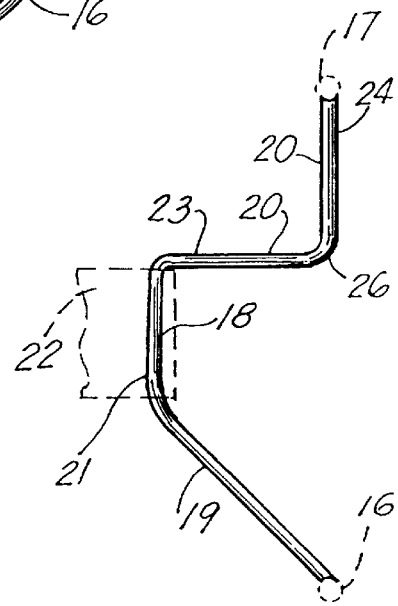
FIG. 6 is a fragmentary sectional elevation view of the burner of FIG. 4.

In the preferred embodiment, the ring 17 can be positioned, for example, about 2–8 inches above the bottom surface 27 of pot 12. Further, the upper ring 17 has an inside diameter indicated as 29 in FIG. 4 that closely approaches the outside diameter 30 of pot 12, as indicated in FIG. 4. A clearance of about ½–1½ inches is provided in between the inside of ring 17 and the outside of pot wall 28 during use.

In FIGS. 1–3, basket 14 includes a wire basket frame 31 that can be, for example, in the form of a plurality of connected (e.g., welded) wire members arranged in a cross (see FIG. 3).

In FIGS. 2–3, basket 14 includes a base comprised of a pair of linear intersecting members 32, 33, a pair of vertical members 34, 35 and a bail 36. The base can have feet for spacing it from the bottom 27 surface of pot 12. Each vertical member 34, 35 has a hook 37, 38 respectively for connecting to the ends 39, 40 of bail 36, as shown in FIG. 2. Bail 36 can be trapezoidal in shape, having handle portion 51, sides 52, 53 and cross beam 54. The enlarged handle 51 enables a user to grip with both hands.

Steamer plate 41 can optionally be placed upon basket 14 if food items are to be steamed. Plate 41 has a generally circular shape, providing peripheral edge 42 and central opening 43. Plate 41 is preferably perforated providing an array of openings therethrough that enable steam to access all surfaces of a food item that is placed on the upper surface 45 of plate 41. Drippings from food items can flow through the openings as well.

Support 46 extends upwardly from base 31 of basket 14. Support 46 has a dual function of holding steamer plate 41 as shown in FIGS. 2 and 7 of supporting a food item such as chicken, turkey or other selected item as shown in FIG. 8.

A pair of laterally extending posts 47, 48 support the peripheral edge 42 of steamer plate 41 when the steamer plate is assembled to the basket 14. Central opening 43 of steamer plate 41 rests upon support 46 when the steamer plate is put in an operational position. The steamer plate is thus supported at its periphery with posts 47, 48 and at its center with support 46. Steamer plate 41 has peripheral slots at 49, 50 that fit vertical members 34, 35 respectively.

The apparatus of the present invention thus provides a dual function cooking apparatus that enables a user to either steam food products such as crabs, lobsters, clams and the like, or boil food items such as fish, shellfish, or poultry items.

Figure 12:
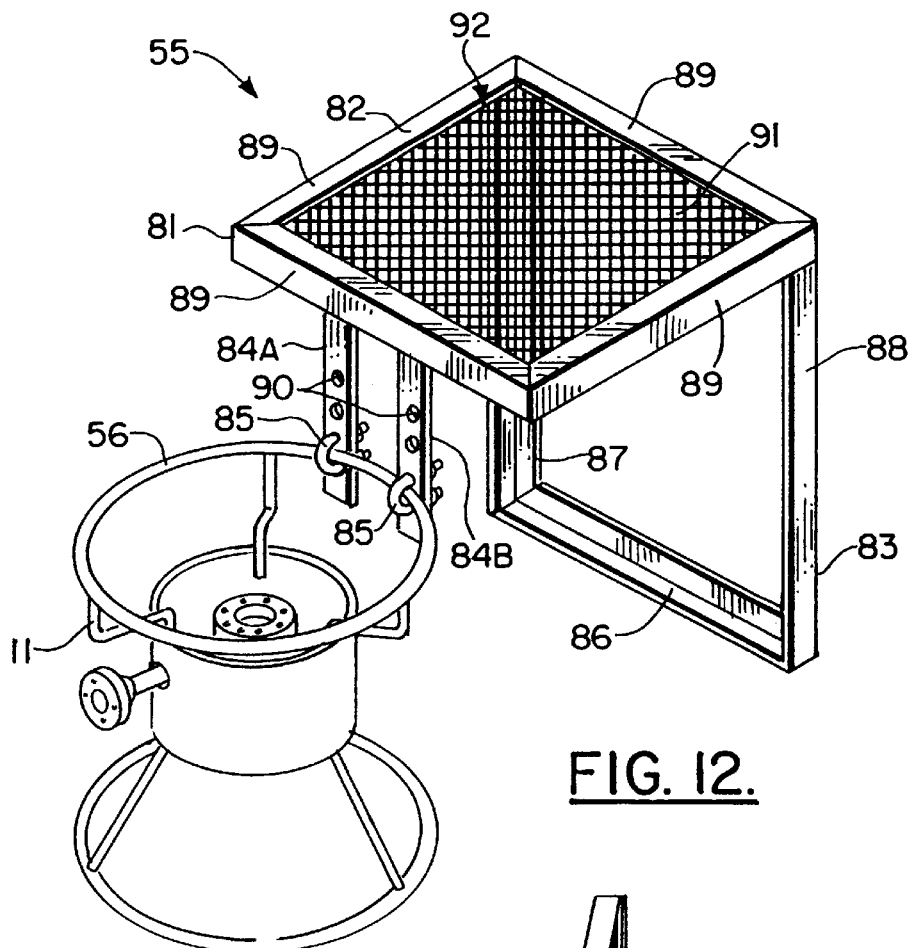
FIGS. 12–12A are perspective views of an alternate embodiment of the apparatus of the present invention.
Figure 12A:
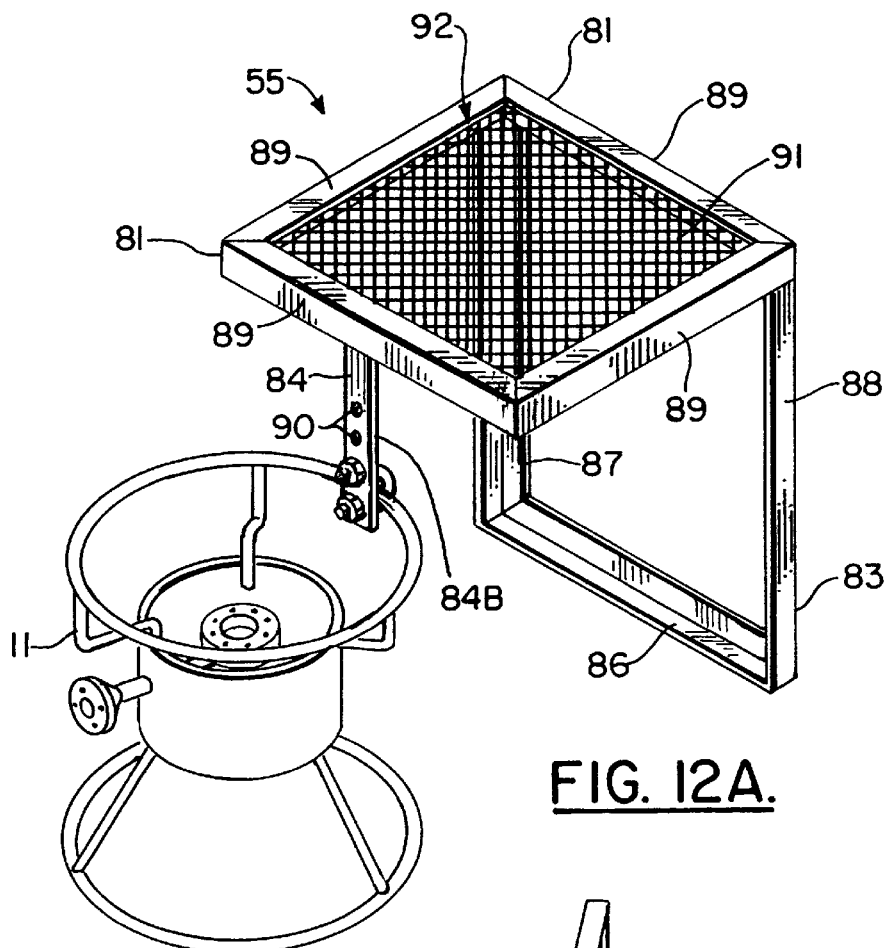
Figure 18:
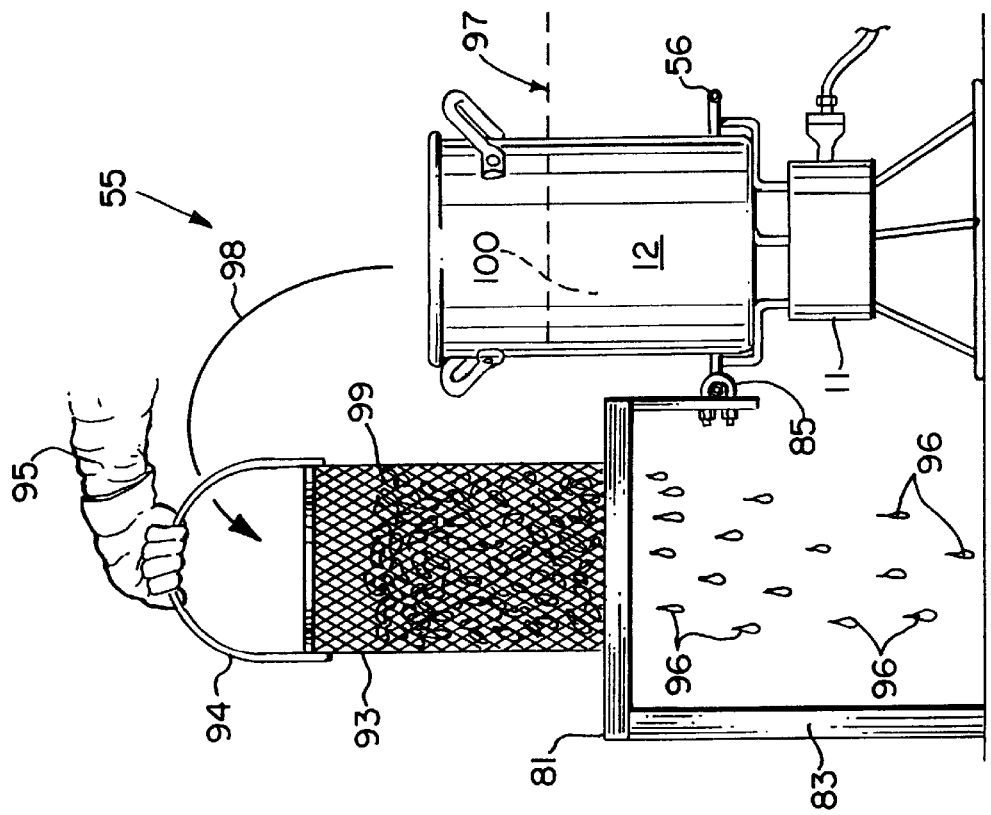
FIG. 18 is another side, elevational view of the alternate embodiment of the apparatus of the present invention shown during operation and after cooking has been completed, a basket filled with seafood or like food items having been placed on the table next to the burner.
Figure 17:
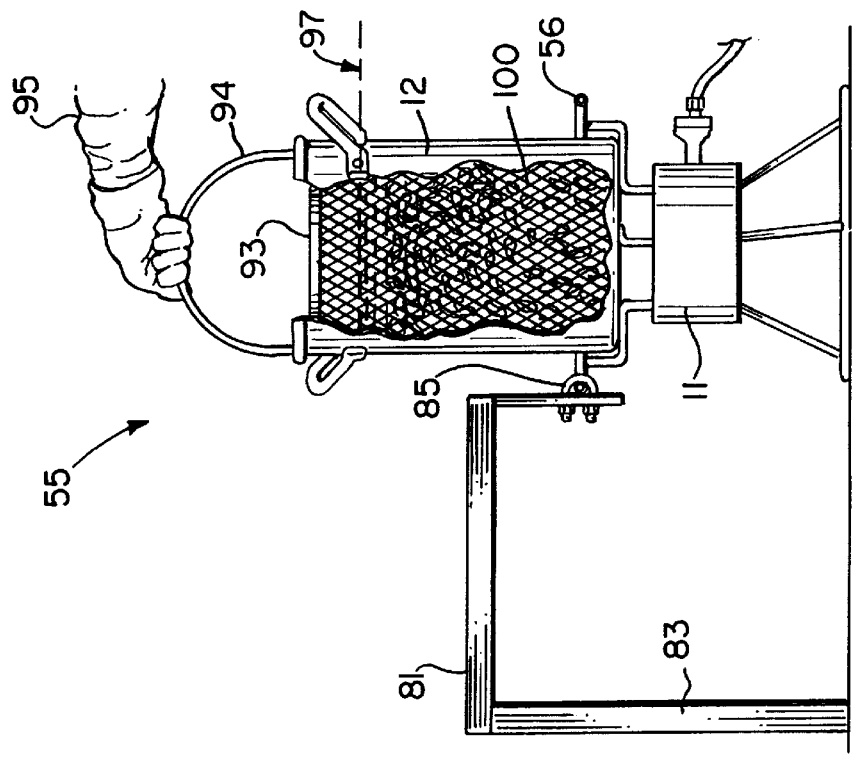
FIG. 17 is a side, elevational view illustrating the alternate embodiment of the apparatus of the present invention shown during cooking and prior to removal of the baskets.
Figure 19:
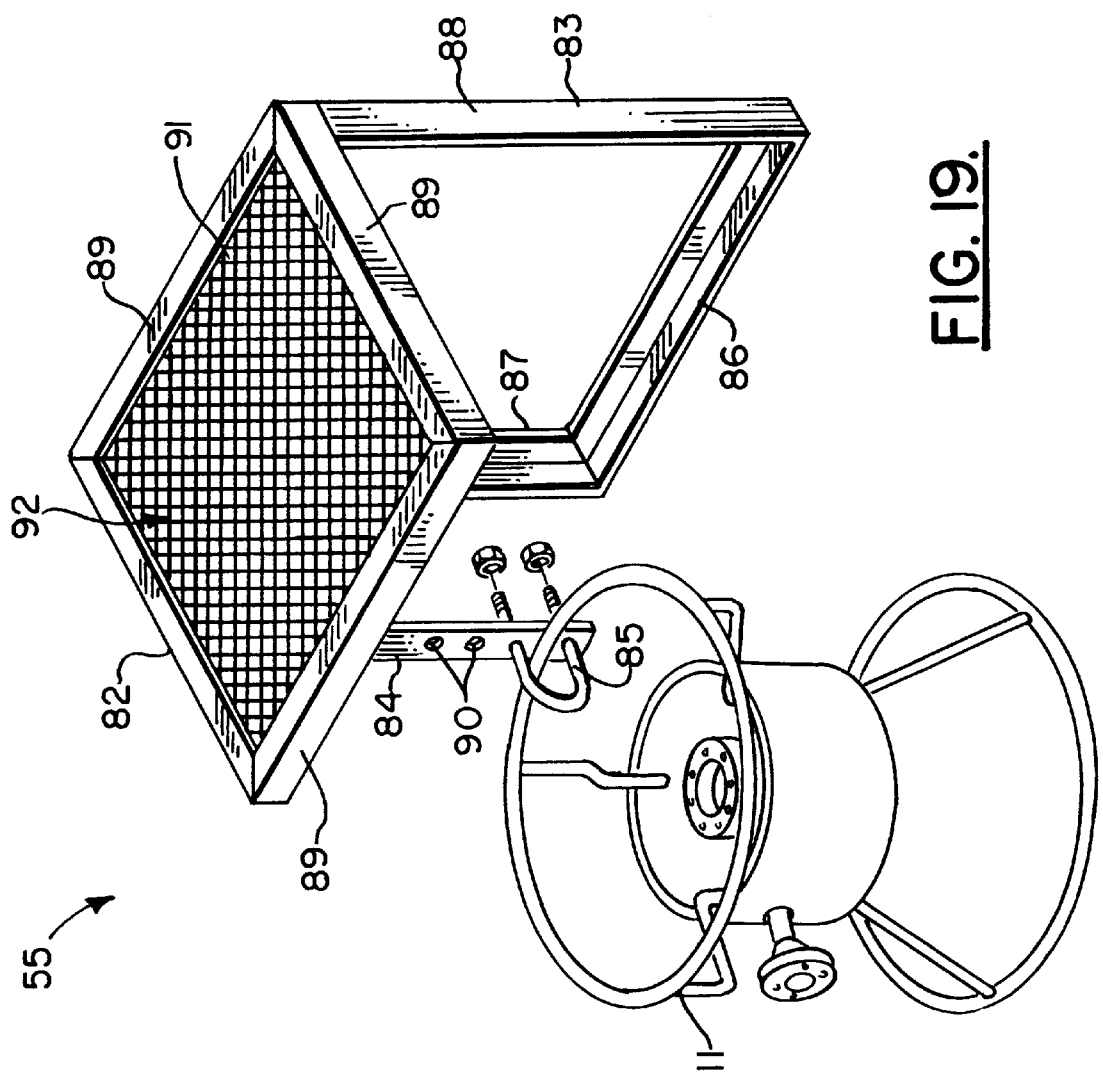
FIG. 19 is a perspective view of the alternate embodiment of the apparatus of the present invention.

FIGS. 9–19 shown an alternate embodiment of the apparatus of the present invention designated generally by the numeral 55 in FIGS. 12 and 17–18.

Outdoor cooking apparatus 55 includes a burner for supporting pot 12. In the alternate embodiment of FIGS. 9–19, table 81 is removably attached to upper ring 17 or 56 of burner 11 or 80. Burner 80 (FIGS. 9–11) includes upper ring 56 and a plurality of horizontal struts 57–59. Vertical struts 60–62 are connected integrally to horizontal struts 57–59 respectively. As shown in FIGS. 9–11, a plurality of legs 63, 67, 71 are attached to horizontal struts 57, 58, 59 respectively. Each leg 63, 67, 71 is formed of a pair of straight sections and a bend section. The leg 63 includes straight sections 64 and 66 connected by bend 65. The leg 67 includes straight sections 68, 70 connected by bend 69. The leg 71 is similarly configured to legs 63 and 67.

A cylindrical flue 72 is placed at the vertical central axis 91 of burner 80 as shown in FIGS. 10 and 11. The cylindrical flue 72 attaches to each of the legs 63, 67, 71 by welding for example. Each leg 63, 67, 71 attaches to a horizontal strut 57, 58, 62, preferably by welding. Each of the vertical struts 60, 61, 62 attaches to upper end 56 by welding, for example. A fuel supply line 73 is used to supply combustible gas such as propane or butane to nozzle 75. The nozzle 75 is preferably attached to the vertical bore 74 of cylindrical flue 72 by welding or like means known in the art.

Circular plate 76 is attached to the inner end portions of horizontal struts 57, 58, 59 as shown in FIGS. 9–11. This attachment of plate 76 to horizontal struts 57, 58, 59 can be by welding for example.

In FIG. 11, the apparatus 55 of the present invention is shown in operating position wherein pot 12 occupies a position on top of the horizontal struts 57, 58, 59. A flame 78 extends upwardly from nozzle 75. The nozzle 75 can be ignited when propane, butane or like gas is transmitted to the nozzle 75 via pipe line 73 using a match, or like starter. Flame 78 strikes the bottom of plate 76 diverting flame 78 laterally to provide even distribution of heat to the bottom of pot 12. This distribution of the flame 78 outwardly and laterally away from plate 76 is indicated schematically by arrows 79 in FIG. 11.

Burner apparatus 11 or 80 can be used in combination with table 81 as shown in FIGS. 12–16, 12A–16A, and 17–19. In the case of burner 11, table 81 attaches to upper ring 17. In the case of burner 80, table 81 attaches to upper ring 56. Table 81 has an upper section 82 supported by a rectangular leg section 83 and vertical struts 84A–84B. Vertical struts 84A–84B removably attach to 17 of burner 11 or to upper ring 56 of burner 80 using a u-bolt 85 that extends through openings 90 in vertical strut 84. Leg section 83 is comprised of horizontal beam 86 and a pair of spaced apart vertical beams 87, 88. In FIGS. 12A–16A and 19, a single strut 84 is provided rather than the dual struts 84A, 84B arrangement of FIGS. 12–16.

Figure 13:
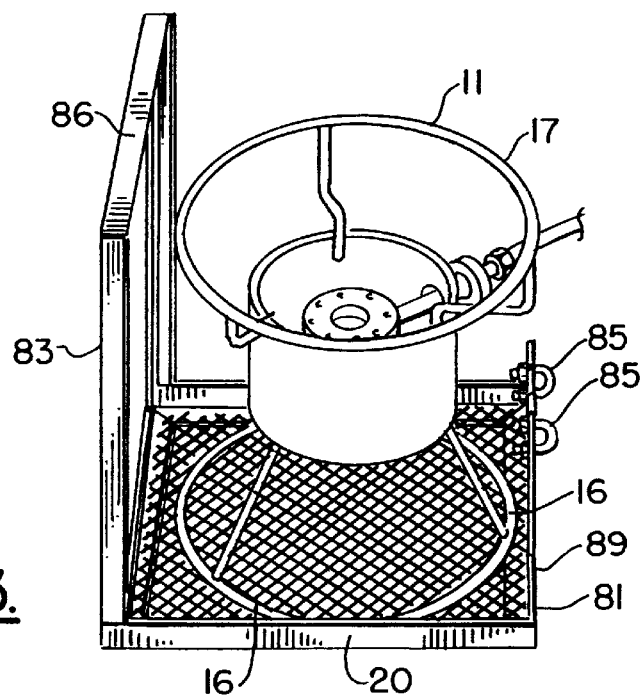
FIGS. 13–13A are perspective views of the alternate embodiment of the apparatus of the present invention.
Figure 13A:
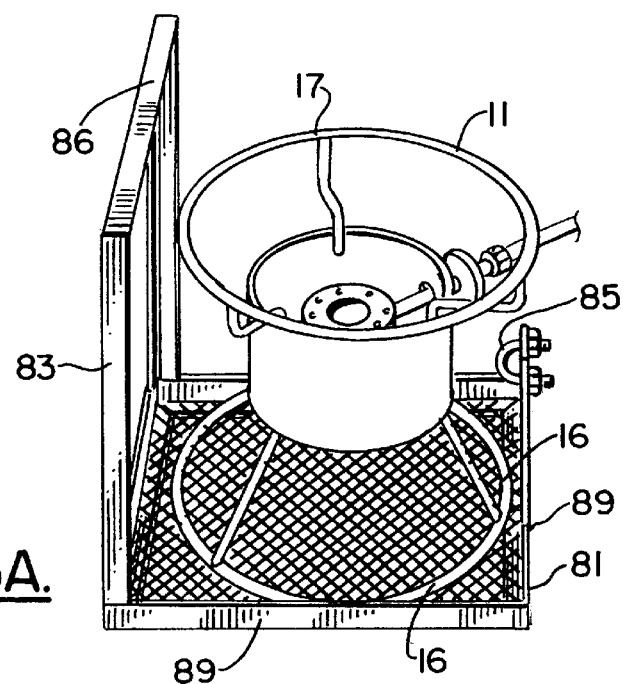
Figure 14:
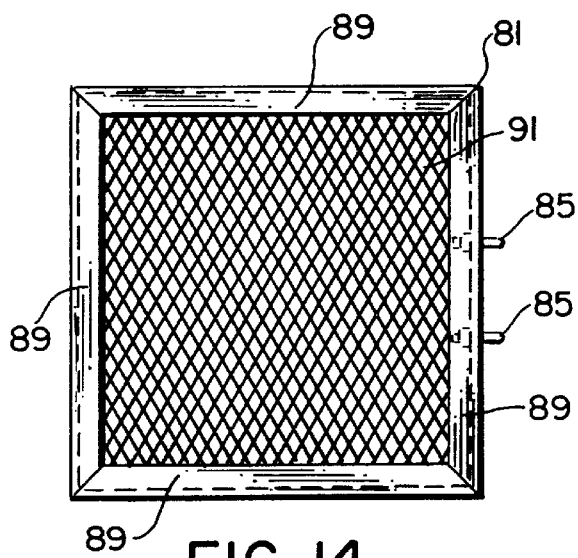
FIGS. 14–14A are top fragmentary views of the alternate embodiment of the apparatus of the present invention.
Figure 15:
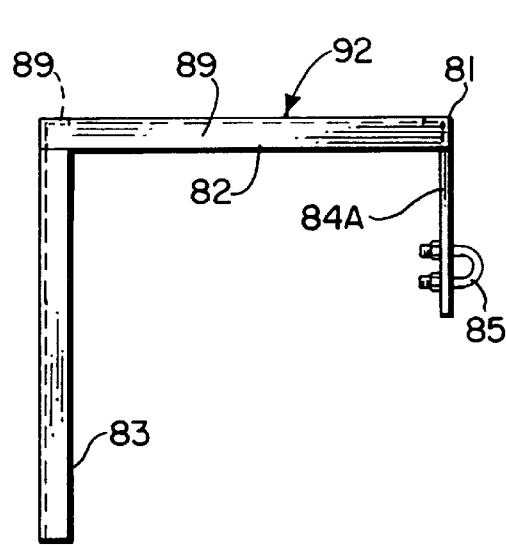
FIGS. 15–15A are side elevation fragmentary views of the alternate embodiment of the apparatus of the present invention.
Figure 16:
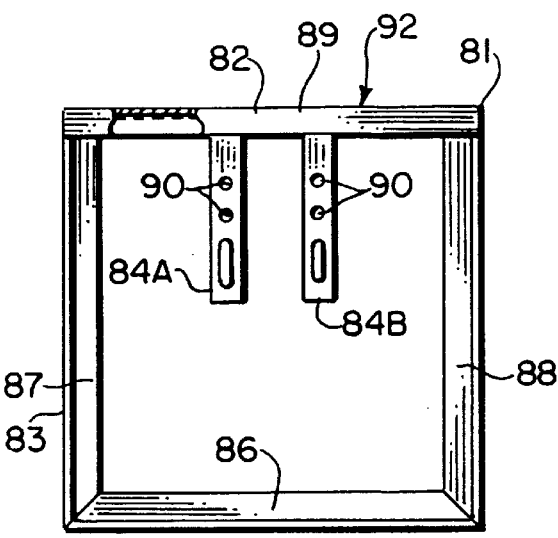
FIGS. 16–16A are partial front elevation views of the alternate embodiment of the apparatus of the present invention.
Figure 14A:
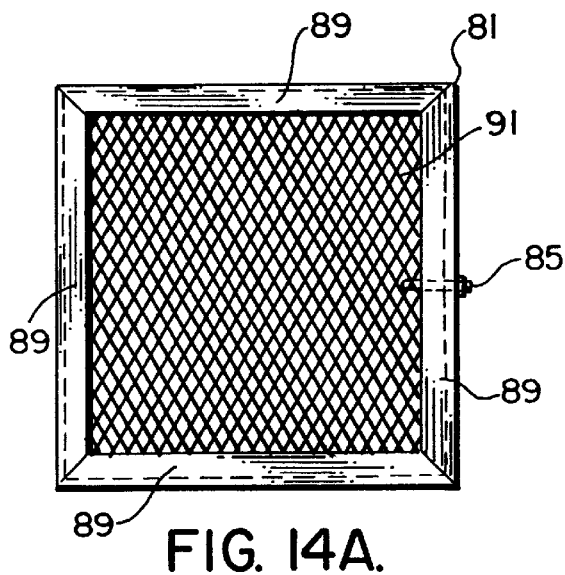
Figure 15A:
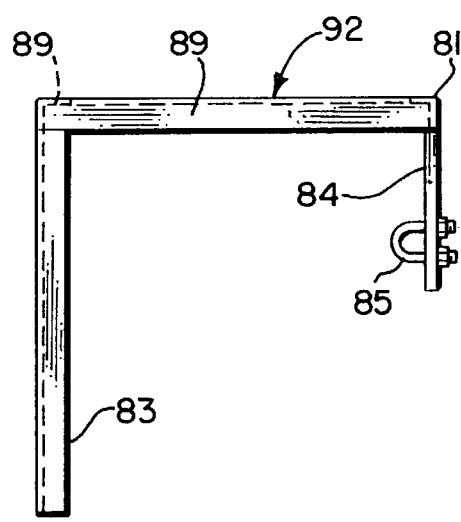
Figure 16A:
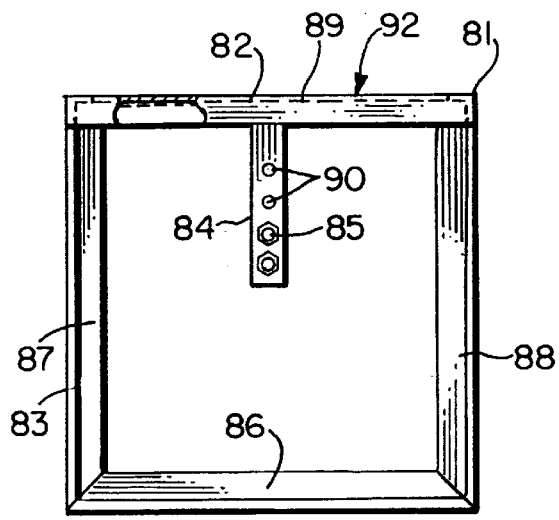

A plurality of four perimeter beams 89 can be welded end to end to form a structural peripheral portion of upper section 82. Expanded metal 91 is connected to (e.g. welded) perimeter beams, and preferably used for the work surface 92 of table 81. Each of the vertical struts 87, 88 can be welded to perimeter beams 89 as shown in the drawings. The perimeter beams 89 are dimensioned to receive either upper ring 17 or lower ring 16 for ease of storage or shipment (see FIGS. 13, 13A). Therefore, the length of each perimeter beam is about equal to or slightly larger than the diameter of ring 16 or ring 17.

Work surface 92 provides a plurality of openings through which liquid can fall when a basket 93 contains seafood or the like that must drain off cooking liquid.

The basket 93 can be provided with a bale 94 that enables a user 95 to lift the basket 93 from pot 12 and plate it on table 81 at work surface 92, as shown schematically by the arrow 95 in FIG. 18. This enables liquid such as crab boil or oil or other cooking medium to drain from basket 93 through the openings in expanded metal 91 as shown by the drops 99 indicated schematically in FIG. 18.

The apparatus 55 utilizes the pot 12 and its contained liquid and food as an anchor. Typically, the pot 12 will have a capacity of 50–100 quarts as an example. The pot 12 will typically be almost filled to capacity during cooking. In FIG. 17, the numeral 99 designate food items and the numeral 100 designates the cooking liquid (seasoned water, hot oil or the like). The mixture of cooking liquid and food items can be seasoned water and seafood. If cooking poultry, the mixture can be boiling oil and one or more poultry item(s).

In FIG. 17, the liquid surface is indicated by the numeral 97 and is near the top of pot 97. In FIG. 18, a user's hand 95 is shown lifting basket 93 with bail 94 in order to place the basket 93 on table 81. This action of moving basket 93 from pot 12 to table 81 at surface 92 is designated by the numeral 98 in FIG. 18.

After basket 93 is removed from pot 12, there is still a considerable volume of liquid in pot 12 as indicated by the liquid level 97 in FIG. 18. Typically, the pot 12 will still contain an amount of liquid equal to between about one half to two thirds of its volume. Thus the pot 12 always contains a substantial amount of liquid in both FIGS. 17 and 18, equal to about 50–100 pounds as a minimum during use in the case of a 100 quart pot. This combined weight of pot and its liquid forms an anchor for table 81 at strap 84, enabling the table 81 to be connected to the assembly of burner 11 or 80 and pot 12. The present invention thus provides a table, burner and pot arrangement that is of a unique configuration, being convenient and safe, while of great utility to the user. The user minimizes lifting by shortening the distance that must be traversed with the hot basket and its steaming contents.

It should be understood that the alternate embodiment of the apparatus of the present invention can be used with either the burner 11 of FIGS. 1–8 or the burner 80 of FIGS. 9–11.

| PARTS LIST The following is a list of suitable parts and materials for the various elements of the preferred embodiment of the present invention | |
|---|---|
| Part Number | Description |
| 10 | apparatus |
| 11 | burner |
| 12 | pot |
| 13 | supply valve |
| 14 | basket |
| 15 | interior |
| 16 | lower ring |
| 17 | upper ring |
| 18 | strut |
| 19 | lower strut section |
| 20 | upper strut section |
| 21 | center strut section |
| 22 | wind guard |
| 23 | lower end |
| 24 | upper linear section |
| 25 | lower linear section |
| 26 | bend |
| 27 | bottom surface |
| 28 | pot sidewall |
| 29 | inside diameter |
| 30 | outside diameter |
| 31 | base |
| 32 | intersecting member |
| 33 | intersecting member |
| 34 | vertical member |
| 35 | vertical member |
| 36 | bail |
| 37 | hook |
| 38 | hook |
| 39 | end |
| 40 | end |
| 41 | steamer plate |
| 42 | peripheral edqe |
| 43 | central opening |
| 44 | openings |
| 45 | upper surface |
| 46 | support |
| 47 | horizontal post |
| 48 | horizontal post |
| 49 | slot |
| 50 | slot |
| 51 | handle portion |
| 52 | side |
| 53 | side |
| 54 | transverse beam |
| 55 | outdoor cooking apparatus |
| 56 | upper ring |
| 57 | horizontal strut |
| 58 | horizontal strut |
| 59 | horizontal strut |
| 60 | vertical strut |
| 61 | vertical strut |
| 62 | vertical strut |
| 63 | leg |
| 64 | straight section |
| 65 | bend |
| 66 | straight section |
| 67 | leg |
| 68 | straight section |
| 69 | bend |
| 70 | straight section |
| 71 | leg |
| 72 | cylindrical flue |
| 73 | fuel supply line |
| 74 | vertical bore |
| 75 | nozzle |
| 76 | circular plate |
| 77 | weld |
| 78 | flame |
| 79 | arrows |
| 80 | burner apparatus |
| 81 | table |

-continued

| PARTS LIST The following is a list of suitable parts and materials for the various elements of the preferred embodiment of the present invention | |
|---|---|
| Part Number | Description |
| 82 | upper section |
| 83 | leg section |
| 84 | vertical strut |
| 84A | Vertical strut |
| 84B | Vertical strut |
| 85 | u-bolt |
| 86 | horizontal beam |
| 87 | vertical beam |
| 88 | vertical beam |
| 89 | perimeter beams |
| 90 | opening |
| 91 | expanded metal |
| 92 | upper work surface |
| 93 | basket |
| 94 | bail |
| 95 | user's hand |
| 96 | drops |
| 97 | liquid surface |
| 98 | arrow |
| 99 | food items |
| 100 | liquid |

The foregoing embodiments are presented by way of example only; the scope of the present invention is to be limited only by the following claims.

I claim:

1. An outdoor cooking apparatus comprising;
   a) a burner frame that supports a nozzle and a conduit for receiving a supply of combustible gas, the burner frame including upper and lower end portions and an upper ring member at the upper end portion;
   b) a cooking vessel that fits the burner frame above the burner nozzle the vessel having a top and a bottom;
   c) a table that removably attaches to the burner frame at the ring, the table having a work surface with a plurality of sides and a leg member, the table being supported at one side by the leg and on its opposite side by the burner frame at the ring.

2. The outdoor cooking apparatus of claim 1 wherein the table has a work surface with openings therein.

3. The outdoor cooking apparatus of claim 1 wherein the table work surface that is positioned at an elevation position during use in between the top and bottom of the cooking vessel, above the elevational position of the upper ring member.

4. The outdoor cooking apparatus of claim 1 wherein the frame includes a lower ground engaging ring member.

5. The outdoor cooking apparatus of claim 1 wherein the frame includes a plurality of legs that are radially extending from the nozzle.

6. The outdoor cooking apparatus of claim 1 wherein the bottom of the vessel is positioned below the upper ring during use.

7. The outdoor cooking apparatus of claim 1 wherein the leg is generally rectangular.

8. The outdoor cooking apparatus of claim 7 wherein the leg has a width that is about the same width as the width of the table work surface.

9. The outdoor cooking apparatus of claim 1 wherein the burner has a diameter that is about the same dimension as the width of the table work surface.

10. The outdoor cooking apparatus of claim 1 wherein the upper ring has a diameter that is about equal to the width of the table work surface.

11. The outdoor cooking apparatus of claim 4 wherein the lower ring has a diameter that is about equal to the width of the table work surface.

12. The outdoor cooking apparatus of claim 1 wherein the upper ring has a diameter that is about equal to the width of the table work surface.

13. A cooking apparatus for enabling a user to cook either by steaming or by boiling a liquid, comprising:
 a) a burner frame having a base for engaging an underlying support surface, the burner frame having a jet for generating a high intensity flame for use in cooking, a supply hose for supplying propane to the burner, the burner having a support surface for cradling a pot;
 b) a pot that includes a generally flat bottom portion and a generally cylindrically shaped continuous sidewall, the pot having a generally cylindrically shaped interior;
 c) the burner including an upper ring that is supported above the bottom of the pot, the upper ring being supported by a plurality of generally "ell" shaped struts that extend from the ring downwardly along a generally vertical path and horizontally to cradle the bottom of the pot;
 d) a table that is supported in part by the burner and that extends well above the ring; and
 e) a leg for supporting the table at a position spaced laterally away from the burner.

14. The cooking apparatus of claim 13 wherein the burner frame includes a circular ring.

15. The cooking apparatus of claim 13 wherein the burner frame includes a plurality of legs, each leg including an inclined section.

16. The cooking apparatus of claim 13 wherein the burner frame includes an upper ring, a lower ring and a plurality of struts connecting the rings, each strut including a horizontal section.

17. The cooking apparatus of claim 13 wherein the burner frame includes a frame having the upper ring, a lower ring and a plurality of struts connecting the rings, each strut including a horizontal section and a vertical section.

18. The cooking apparatus of claim 4 wherein the frame includes at least three radially extending sections spaced circumferentially apart.

* * * * *